…

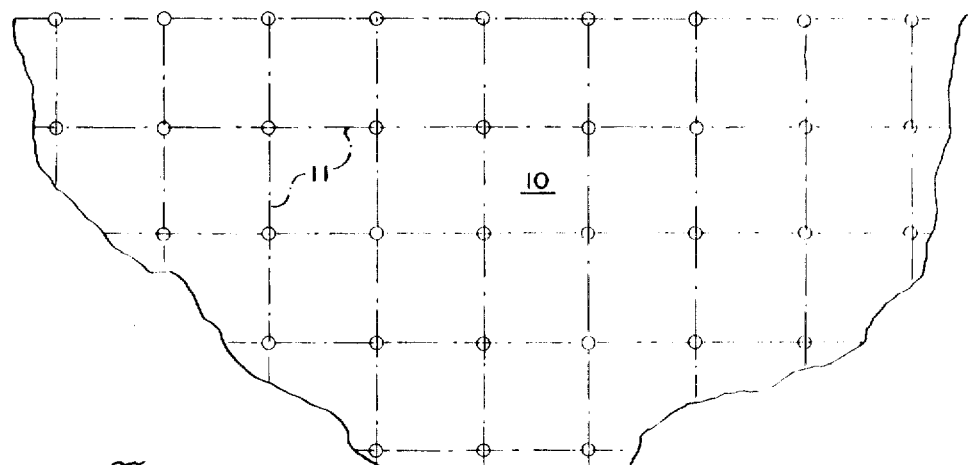
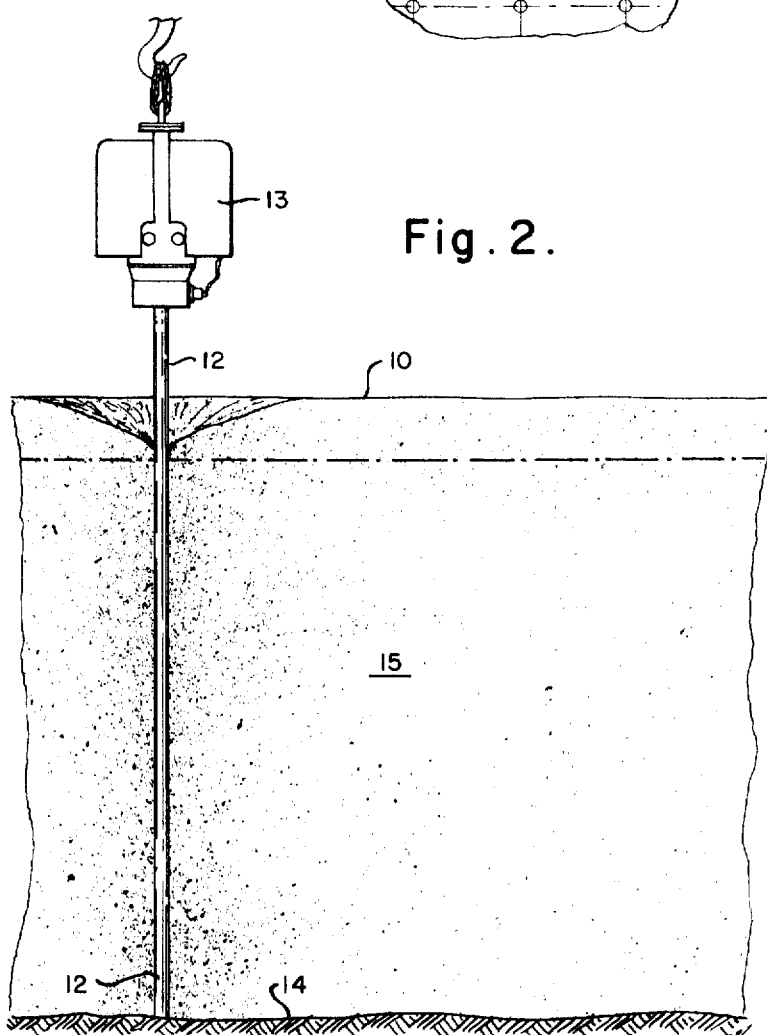

United States Patent Office 3,621,659
Patented Nov. 23, 1971

---

3,621,659
METHODS OF SOIL COMPACTION
Robert D. Anderson, Pittsburgh, Pa., Alvin E. Herz, Nutley, N.J., Clabeorn Jones, Dawson, Ga., Harold Strickland, Gretna, La., and William K. Wilson, Mammouth, Ark., assignors to L. B. Foster Company, Pittsburgh, Pa.
Filed July 10, 1969, Ser. No. 840,619
Int. Cl. E02f 1/00
U.S. Cl. 61—35                                7 Claims

ABSTRACT OF THE DISCLOSURE

A method of compacting soil is provided using the steps of driving a probe into the soil to be compacted using a vibratory driver and extracting said probe using a vibratory extractor and repeating the same steps at spaced intervals over the area to be compacted.

---

This invention relates to methods of soil consolidation and particularly to a method of soil consolidation in which the soil is subjected to vibratory forces through a probe extending substantially into the depth of material to be consolidated.

The need for a satisfactory method of rapidly consolidating soil has long been recognized and many different methods have been proposed and used. Most methods which have been used have been slow and expensive. For example it has long been the practice to compact soil by drawing weights such as a sheeps foot roller across the surface as the soil is placed in the fill area. Similarly it has been proposed to subject the surface of an area to be compacted to a tamping action with air hammers and vibrating hammers of various types and to surcharging. All of these methods of compaction are slow and expensive.

The present invention provides a method of compacting soil which is much more rapid than prior art methods and much less expensive. For example an equivalent area of sand fill, forty feet deep can be compacted in a fraction of the time and at about 1/15 the cost of Vibro flotation or heavy equipment compaction. This is obviously an amazing reduction in cost and time.

Preferably the method includes the steps of driving a probe by vibratory force into the soil to be compacted to the base of said soil to be compacted and then extracting the same with vibratory force. Preferably the probe is driven and extracted on a regular grid pattern over the surface of the area to be compacted. Varying the spacing of the probes can increase or decrease the density. The probe is preferably a pipe pile such as a 3/8″ wall 30″ open end pipe driven on a grid pattern 10 feet on a side. These dimensions are not critical and various thickness of pipe wall, pipe diameter and grid spacing may be used depending upon the character of the soil to be compacted, its depth and previous treatment and other like considerations. The probe is not necessarily a pipe but could take the form of an H-beam, I-beam, wide flange beams or any combination thereof as well as any other form of probe of sufficient section and length to be driven and extracted to the desired depth. Preferably the vibratory driver is one which provides up to 10,000 c.p.m. of vibrations to the probe although 700 or 1500 vibrations per minute to the probe is preferred.

In the foregoing general statement of this invention certain objects, purposes and advantages have been pointed out. Other objects, purposes and advantages will be apparent from a consideration of the following description and the accompanying drawings in which:

FIG. 1 is a top plane view of an area being consolidated by the method of this invention showing a typical grid pattern; and FIG. 2 is a sectional view of an area being consolidated showing a pipe probe being used for consolidation.

Referring to the drawings there is illustrated a surface area 10 of sand fill to be consolidated. The surface area is laid out in grid pattern 11 in which a probe 12 is driven and extracted at each intersection of the grid lines. As shown in FIG. 2 the probe 12 is driven by a vibratory driver 13 such as an L. B. Foster Co. "PTC Vibro Driver" to the base 14 of the fill 15 and is extracted by the same "PTC Vibro Driver" resulting in the compaction of the soil and a general lowering of the surface as for example to the chain line on FIG. 2.

The process of this invention can perhaps be best understood by reference to the following example illustrating the practice of the invention.

EXAMPLE

An area of fifty acres which had been hydraulically filled with fine to medium sand to a depth of about 70 feet was treated by driving a 30″ diameter pipe pile having a 3/8″ wall down to the base of the fill 70 feet below the surface with an L. B. Foster "PTC Vibro Driver" and extracting the same with the same driver at each point on a 10 foot side grid over the surface of the filled area. The soil prior to treatment and had a weight of 90 to 95 pounds per cubic foot and after treatment a weight of 110 to 115 pounds per cubic foot. A standard penetration test showed from two to four times increase in the density of the soil in the filled area. The time for accomplishing this was a fraction of the time that would have been required for any conventional compaction method and the cost was approximately 1/15 to 1/25 of the cost of using the Vibro flotation process which is frequently used in areas such as this example.

The vibratory driver may be an electric, hydraulic or other powered vibratory driver.

The method of soil consolidation here disclosed can be used to increase the density of soil under and around all types of piling and piling structures that are already in place. This includes piles that are driven by any of the well known impact means (drop hammer, air hammer, steam hammer and diesel hammer) as well as piles that have been jetted into place and combinations thereof.

While certain preferred practices and embodiments of this invention have been described in the foregoing specification it will be understood that this invention may be otherwise embodied within the scope of the following claims.

We claim:

1. The method of compacting soil comprising the steps of:
   (a) driving a hollow, open ended probe into the soil to be compacted embracing within the interior of the probe a substantial portion of soil to be compacted while continuously providing a vertical vibratory component of motion to said probe whereby said probe is driven into the soil, and the soil is compacted and
   (b) extracting said probe while continuously providing a vertical vibratory component of motion to said probe whereby said probe is extracted and the soil compacted.

2. The method of compacting soil as claimed in claim 1 wherein a probe is driven and extracted in a regular pattern over the area to be compacted.

3. The method of compacting soil is claimed in claim 2 wherein said probe is driven to the base of the soil to be compacted and then extracted.

4. The method of compacting soil as claimed in claim 2 wherein a probe is driven and extracted on a regular grid pattern having centers between about 3 feet to 15 feet apart.

5. The method of compacting soil as claimed in claim 1 wherein the driver and extractor provide vibrations on the probe in the range 700 to 1500 per minute.

6. The method as claimed in claim 4 wherein a center probe is driven and extracted in each grid arrangement of the grid pattern for further densification.

7. The method of compacting soil as claimed in claim 1 wherein the driver and extractor provide vibration on the probe up to 10,000 c.p.m.

References Cited
UNITED STATES PATENTS

| | | | |
|---|---|---|---|
| 3,344,873 | 10/1967 | Baittinger | 175—19 X |
| 1,598,300 | 8/1926 | Moran | 61—35 |
| 1,865,652 | 7/1932 | Upson | 61—53.64 |
| 2,236,759 | 4/1941 | Lyman | 61—35 |
| 3,204,414 | 9/1965 | Steverman | 61—36 |
| 3,245,223 | 4/1966 | Degen | 61—63 X |
| 3,282,055 | 11/1966 | Landav | 61—36 |

DAVID J. WILLIAMOWSKY, Primary Examiner

P. C. KANNAN, Assistant Examiner

UNITED STATES PATENT OFFICE
CERTIFICATE OF CORRECTION

Patent No. 3,621,659            Dated November 23, 1971

Inventor(s) Robert D. Anderson et al.

It is certified that error appears in the above-identified patent and that said Letters Patent are hereby corrected as shown below:

Column 1, line 41, "Vibro" should read --- vibratory ---.

Column 2, line 32, "Vibro" should read ---vibratory ----.

Signed and Sealed this

Twenty-sixth Day of October 1976

[SEAL]

Attest:

RUTH C. MASON
*Attesting Officer*

C. MARSHALL DANN
*Commissioner of Patents and Trademarks*

Notice of Adverse Decision in Interference

In Interference No. 98,153, involving Patent No. 3,621,659, R. D. Anderson, A. E. Herz, C. Jones, H. Strickland and W. K. Wilson, METHODS OF SOIL COMPACTION, final judgment adverse to the patentees was rendered Feb. 13, 1975, as to claims 1 and 2.

[*Official Gazette May 3, 1977.*]